Nov. 23, 1926.
E. D. PUTT
TIRE STRIPPING MACHINE
Filed Jan. 20, 1925   2 Sheets-Sheet 1
1,608,425
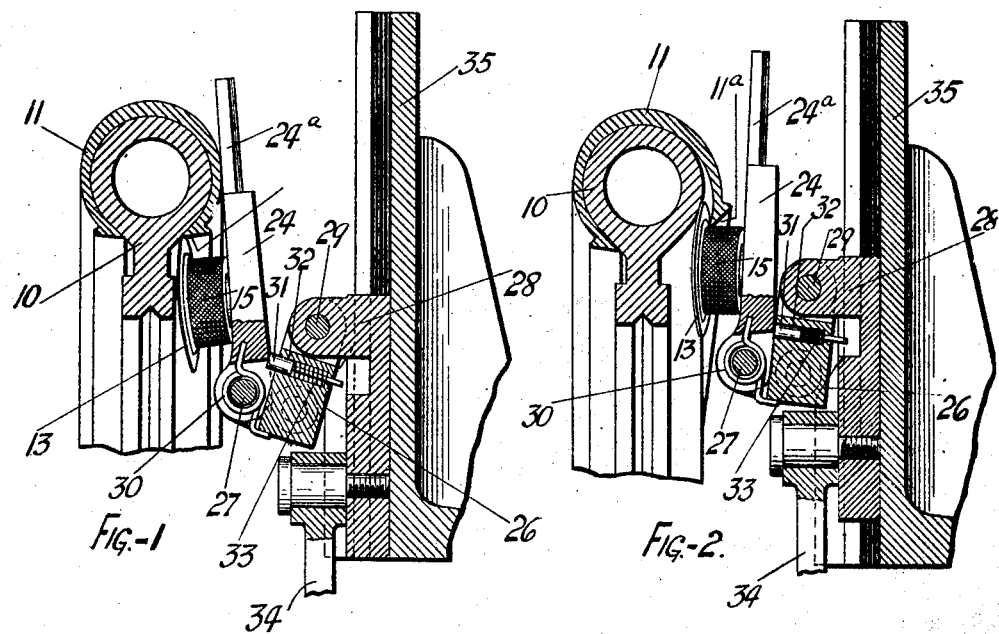
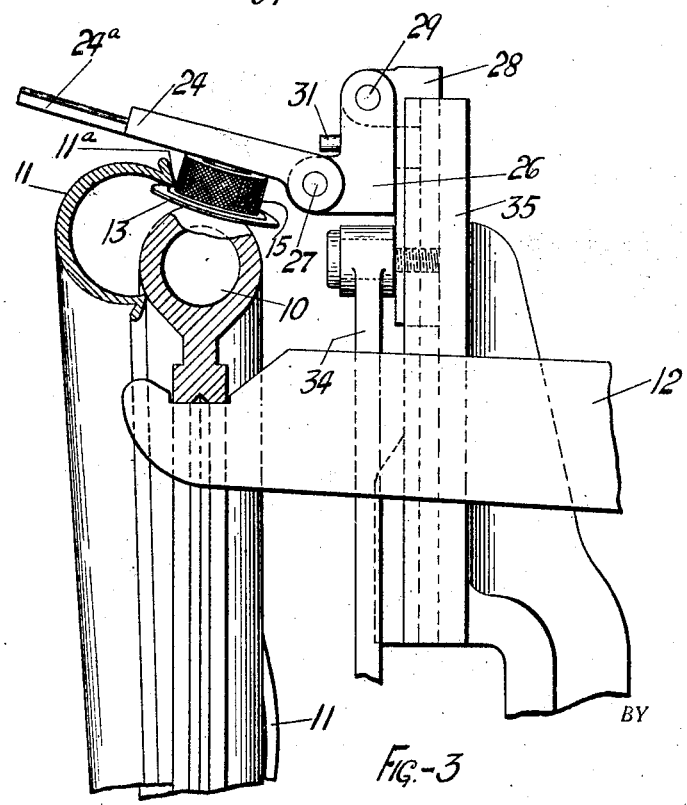
INVENTOR.
EDWARD D. PUTT.
BY
ATTORNEY.

Nov. 23, 1926.

E. D. PUTT 1,608,425

TIRE STRIPPING MACHINE

Filed Jan. 20, 1925    2 Sheets-Sheet 2

INVENTOR.
EDWARD D. PUTT.

BY

ATTORNEY.

Patented Nov. 23, 1926.

1,608,425

UNITED STATES PATENT OFFICE.

EDWARD D. PUTT, OF AKRON, OHIO, ASSIGNOR TO THE FIRESTONE TIRE AND RUBBER COMPANY, OF AKRON, OHIO, A CORPORATION OF OHIO.

TIRE-STRIPPING MACHINE.

Application filed January 20, 1925. Serial No. 3,636.

This invention relates to machines for stripping tires from the cores on which they are vulcanized.

In the manufacture of tires of the clincher type i. e. the type in which the beads are extensible it is customary to build the tires on integral cores to vulcanize them thereon and to strip them therefrom. In the past stripping devices of the general type shown in the Patent to Putt, No. 1,428,979, granted September 12, 1922 have been employed. The present invention is directed to improvements in such devices and particularly to improvements adapted to be applied to the stripping device shown and described in the patent to Putt, No. 1,520,663, granted December 23, 1924.

In the stripping devices, as shown in the prior patents, there are provided a pair of arms extending radially of the core and which are movable apart angularly of the core from positions closely adjacent each other to positions substantially diametrically opposite from each other. On these arms are slides carrying stripping devices movable radially of the tire. Mechanism is provided for moving the stripping devices first radially outwardly on the slides and then for moving the arms angularly apart about the core to accomplish the stripping operation.

In past constructions the stripping devices have included an arm hinged onto the radially movable slide and a second arm hinged onto the first arm and carrying a stripping roller formed with a bead-engaging flange. The arms are connected together for yielding movement from and toward each other to provide for the stripping roller to follow the surface of the core during its movement radially outwardly during which it forces the bead outwardly of the core and to permit of its following the core surface as it is carried circumferentially of the core by the angularly moving arms.

The present invention is directed to an improved stripper roller and mounting for the same whereby it may more accurately follow the core surface and will be held in the same relative position to the core surface at every position of the strippers with respect to the core, whereby mutilation of the beads of the tire such as occurs occasionally and sometimes frequently with certain kinds or sizes of tires is practically eliminated. The invention also has for an object the prevention of mutilation of the core by cutting of the flanges on the stripping rollers thereinto.

The foregoing and other objects are obtained by the construction illustrated in the accompanying drawings and described below. It is to be understood that the invention is not limited to the specific form thereof shown and described.

Of the accompanying drawings:

Figure 1 is a vertical section illustrating a stripper at the start of the stripping operation;

Figure 2 is a similar view illustrating an intermediate position of the stripper during the stripping operation;

Figure 3 is a similar view depicting the stripper in another intermediate position during the stripping operation;

Figure 5:
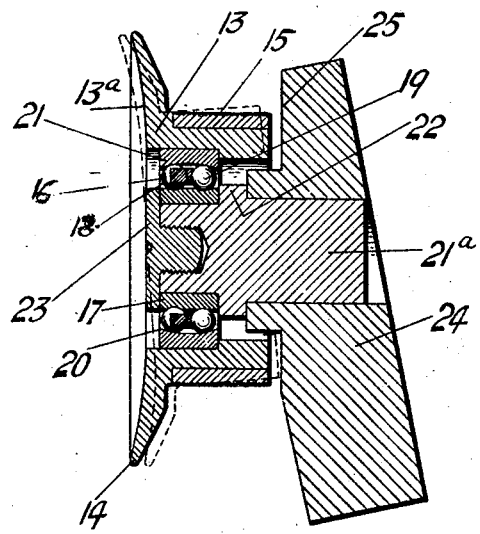
Figure 5 is a detail section illustrating the improved stripping roller and its mounting.

Referring to the drawings, 10 indicates a core having a tire 11 thereon which is to be stripped therefrom. The numeral 12 indicates one of a series of core clamping and supporting fingers such as have been employed to secure the cores 10 in position for operation thereon by the strippers.

Arranged for operation on the core 10 are stripping rollers 13, 13 (see Figure 5) each formed with a flange 14 for passing between the bead 11$^a$ of tire 11 and the core 10 and with a concave outer face 13$^a$, which result is reduced stretching of the tire and also reduced friction of the roller against the core, since there will be less pressure reacting on the flange of the roller than in constructions employing a roller with a convex face. Journaled on each roller 13 there is a sleeve 15 knurled or roughed on its outer surface and adapted to be engaged by the toe of the bead during a stripping operation, the roller 13 and sleeve 15 being independently rotatable so that rotation of roller 13 due to movement in contact with core 10 and bead 11$^a$ will be independent of rotation of sleeve 15 caused by its movement in contact with the bead 11$^a$ only, considerable friction being thus avoided whereby tendency to break or mutilate the bead 11$^a$ will be minimized.

Roller 13 is mounted on a standard radial bearing 16 including an inner ball race 17 receiving two sets of balls 18 and 19 held in position thereon out of contact with each other by the usual cage 20 and an outer ball race 21 formed with an axially arched or concave inner surface and with an outer surface on which the roller 13 is mounted whereby the roller 13 is capable of assuming various axial positions so that its face 13$^a$ will position itself substantially tangentially to the core in any of its positions with respect thereto assumed during the stretching operation. By this provision, stretching of the bead is reduced to a minimum and breakage or mutilation thereof will accordingly not result.

Bearings 16 are each secured on a spindle 21$^a$ by being clamped between a shoulder 22 on the spindle and a screw 23 threaded into the outer end of the spindle. The spindle 21$^a$ is secured on an arm 24 in such manner as to support each spindle in a position radially of the tire when in the intermediate position shown in Figures 3 and 4, the arm 24 being cut away at an inclination as shown at 25 to provide for clearance of the roller 13 to permit its axial position normally to be radially of the core in the positions shown in Figures 3 and 4 and also to provide for clearance for the roller as it varies its axial position with respect to spindle 21.

Arm 24 is hinged to a second arm 26 at 27 and arm 26 is in turn hinged to a slide 28 at 29. A coiled spring 30 on hinge 27 is connected to arms 24 and 26 in such a manner as to tend to urge the free end of arm 24 toward the pivot 29, and balancing this action to hold the arms normally substantially in the position shown in Figure 1, is a pin 31 operable in a bore 32 in arm 26 and urged outwardly thereof into engagement with arm 24 by a spring 33. To positively prevent cutting of the core by roller 13 a positive stop member 24$^a$ is secured on arm 24 so as to prevent the roller 13 from being improperly presented to core 10 by operation of springs 30 and 33.

Each slide 28 is movable by a lever 24 along an arm 35 to which each slide is slidably connected, the lever 34 being operated as will be understood by such mechanism as illustrated in the patent and application referred to. Each arm 35 is angularly operable from or toward the other arm to carry the rollers 13 circumferentially about the core in the manner already disclosed in the prior art and not shown herein.

In the operation of a stripper embodying the improved means, a core carrying a tire is mounted therein and secured for the stripping operation by the fingers such as 12. The strippers are then actuated by the mechanism (not shown) into the position shown in Figure 1, the arms 35 extending substantially radially of the core and being closely adjacent each other, and stops 24$^a$ positively positioning flanges 14 so that they will be directed between the bead 11$^a$ and core 10 without cutting into the core or bead. In positioning the strippers, as they move downwardly past the core 10, the yielding connection between arms 24 and 26 permits them to ride over the side of the tire 11 without harming it.

The mechanism then actuates the slides 28 upwardly, the flange 14 of roller 13 passing between the bead 11$^a$ and core 10 and the toe of the bead engaging sleeve 15. The radial bearing 16 and the yielding connection between arms 24 and 26 permit the face 13$^a$ of roller 13 to closely follow the cross-sectional periphery of the core, the arms 24 and 26 being at first urged together against the action of spring 33 as is clearly illustrated in Figure 2.

Figure 4:
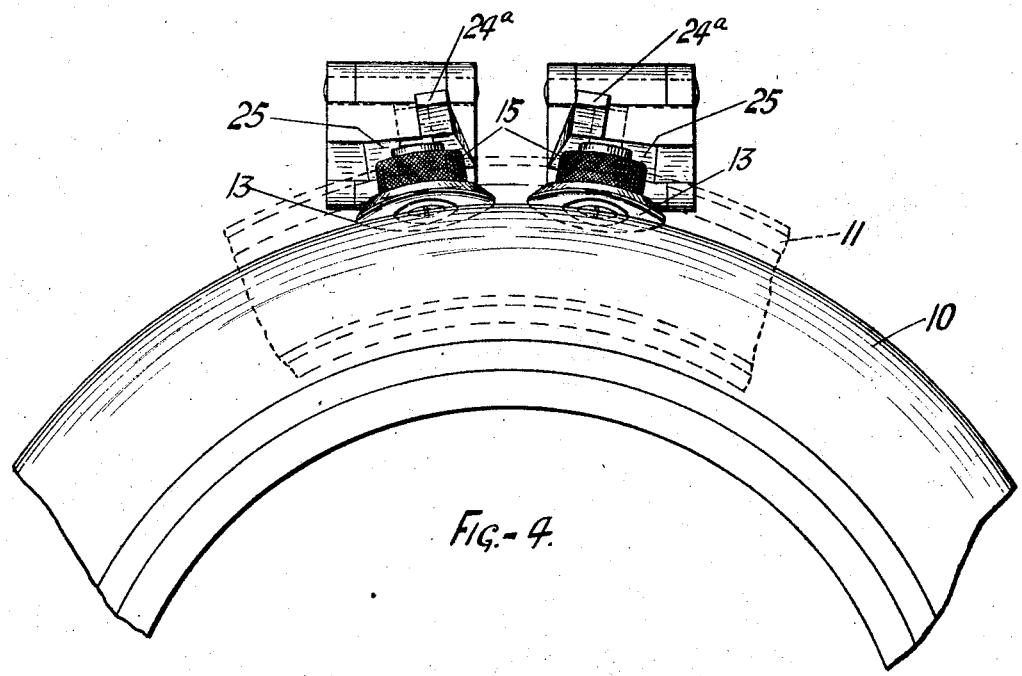
Figure 4 is a front elevation illustrating the position of the pair of strippers when each member thereof is positioned as shown in Figure 3.

As the slides 28 continue upwardly arms 24 will be drawn outwardly against the action of springs 30 by reason of the engagement of bead 11$^a$ with flanges 14 and consequently the strippers and arms 24 and 26 will assume the positions shown in Figures 3 and 4, the bearings 16 permitting the rollers 13 to assume the axial positions which they naturally would tend to assume with respect to the particular portion of the core with which they contact.

Finally, with slides 28 in their outermost positions on arms 35 the arms are moved apart angularly to carry the strippers circumferentially about the core away from each other, the inner bead 11$^a$ being thus progressively forced over the core 10 sufficiently so that the tire may be removed from the core. As the rollers travel circumferentially about the core, flange portion 14 will assume a rotary movement depending on the frictional effect of the flange on the core and perhaps slightly on the inner side of the bead while sleeve 15 will rotate independently thereof due to friction on the toe of the bead only. The friction of the stripper on the tire and core is as has been stated, accordingly diminished.

When the tire 11 is removed after the stripper operation, the arms 24 will be again urged into substantially the positions with respect to arms 26 in which they are shown in Figure 1. The next core carrying a tire to be stripped is then mounted in the machine as described and the various operations are repeated.

Modifications of the invention may be resorted to without departing from the spirit thereof or the scope of the appended claims.

What is claimed is:

1. Apparatus for stripping tire casings from cores comprising in combination means for supporting a core having a casing thereon, and means for stripping the casing from the core, said means including a roller mounted so as to be self-aligning.

2. Apparatus for stripping tire casings from cores comprising in combination means for supporting a core having a casing thereon and means for stripping the casing from the core, said means including a roller, one face of which is adapted to follow the core surface and to progressively adapt itself substantially to positions with the axes of the roller normal to the cross-sectional curvature of the core as it moves over the outer surface thereof.

3. Apparatus for stripping tire casings from cores comprising in combination means for supporting a core having a tire casing thereon and means for stripping said casing from said core including a slide, a shiftable mounting on the slide, and a roller, said roller being self-aligning on said mounting.

4. A device for stripping tire casings from cores comprising a stripping roller and a spindle therefor, said roller being mounted on a self-aligning bearing on the spindle.

5. A device for stripping tire casings from cores comprising a stripping roller and a spindle therefor, said roller being adapted to assume various axial positions with respect to said spindle.

6. A device for stripping tire casings from cores comprising a stripping roller, a spindle therefor, and a self-aligning bearing on the spindle by which said roller is journaled thereon.

7. In a device for stripping tire casings from cores, a roller formed with a flange on its outer side for passing under a bead on a core, said outer side of said roller being dished or concave.

8. In a device for stripping tire casings for a core, an arm, a stripper on the arm, yielding means for holding the stripper against the core, and means on the arm to engage the core for positively limiting the action of the yielding means.

EDWARD D. PUTT.